(12) United States Patent  (10) Patent No.: US 7,734,784 B1
Araujo et al.  (45) Date of Patent: Jun. 8, 2010

(54) DYNAMIC SERVICE ACTIVATION USING COPS-PR TO SUPPORT OUTSOURCING AND CONFIGURATION MODELS FOR POLICY CONTROL

(75) Inventors: Wladimir Araujo, Ottawa (CA); Mohammad H. Sajedi, Acton, MA (US); Altaf H. Ali, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 623 days.

(21) Appl. No.: 11/534,460

(22) Filed: Sep. 22, 2006

(51) Int. Cl.
 *G06F 15/173* (2006.01)
 *G06F 15/16* (2006.01)

(52) U.S. Cl. .................. 709/226; 709/203; 709/223; 709/238; 709/250

(58) Field of Classification Search ......... 709/202–203, 709/223–226, 238–239, 250
See application file for complete search history.

(56) References Cited

U.S. PATENT DOCUMENTS

| | | | | |
|---|---|---|---|---|
| 5,870,561 | A * | 2/1999 | Jarvis et al. ................. | 709/223 |
| 6,587,876 | B1 * | 7/2003 | Mahon et al. ................ | 709/223 |
| 6,718,380 | B1 * | 4/2004 | Mohaban et al. ............ | 709/223 |
| 6,775,701 | B1 * | 8/2004 | Pan et al. ..................... | 709/226 |
| 6,816,903 | B1 * | 11/2004 | Rakoshitz et al. ........... | 709/226 |
| 7,185,073 | B1 * | 2/2007 | Gai et al. ..................... | 709/223 |
| 7,409,447 | B1 * | 8/2008 | Assadzadeh ................. | 709/225 |
| 7,426,580 | B2 * | 9/2008 | Monga et al. ................ | 709/250 |
| 7,606,146 | B1 * | 10/2009 | Pan et al. ..................... | 709/226 |
| 2005/0149881 | A1 * | 7/2005 | Proulx et al. ................. | 709/223 |
| 2006/0036730 | A1 * | 2/2006 | Graham et al. .............. | 709/224 |
| 2007/0208854 | A1 * | 9/2007 | Wiryaman et al. .......... | 709/225 |
| 2009/0287627 | A1 * | 11/2009 | Van Elburg .................. | 706/47 |

OTHER PUBLICATIONS

K. McCloghrie et al., "RFC3159 — Structure of Policy Provisioning Information (SPPI)", Aug. 2001, 30 pages.
K. Chan et al., "RFC3084 — COPS Usage for Policy Provisioning (COPS-PR)", Mar. 2001, 25 pages.
S. Hahn et al., "RFC3318 — Framework Policy Information Base", Mar. 2003, 53 pages.
K. Chan et al., "RFC3317 — Differentiated Services Quality of Service Policy Inf", Mar. 2003, 72 pages.

* cited by examiner

*Primary Examiner*—Bharat N Barot
(74) *Attorney, Agent, or Firm*—Harrity & Harrity, LLP

(57) ABSTRACT

A device may include a service activation engine (SAE) including: a policy information base (PIB) file that defines a plurality of attachments that correspond to a plurality of network policies; and a server. The server may receive a request, using common open policy service for policy provisioning (COPS-PR), for a network service related to an interface handle associated with a subscriber device; determine which ones of the network policies correspond to the network service; and send, using COPS-PR, a provisioning instance (PRI) including a first of the attachments to implement the ones of the network policies to the interface handle based on the attachments.

21 Claims, 5 Drawing Sheets

DYNAMIC SERVICE ACTIVATION USING COPS-PR TO SUPPORT OUTSOURCING AND CONFIGURATION MODELS FOR POLICY CONTROL

FIELD OF THE INVENTION

Implementations consistent with principles of the invention relate generally to computer and data communications and, more particularly, to techniques for implementing network policies.

BACKGROUND OF THE INVENTION

Network service providers, such as Internet service providers (ISPs), typically allocate network resources to a remote access subscriber which correspond to a set of network services defined in a service level agreement (SLA) between the ISP and the subscriber. Some network services are activated upon subscriber login and creation of a network interface at a policy enforcement point (PEP), such as a router, and deactivated upon logoff by the subscriber, thereby deleting the network interface. Other network services may be activated/deactivated dynamically during a network session.

A given network service may be activated/deactivated by applying a corresponding network policy to a subscriber connection via the network interface, which is provided by a policy decision point (PDP), in accordance with the SLA associated with the network interface established for the subscriber connection. Policy decisions may be communicated from the PDP to the PEP using a standard communications protocol, such as that defined in Internet Engineering Task Force (IETF) document, RFC 3084, COPS (common open policy service) Usage for Policy Provisioning (COPS-PR).

COPS-PR is a query/response protocol that defines how policies may be represented and encoded for provisioning. COPS-PR supports two common models for policy control: outsourcing and configuration. Conventionally, either the outsourcing model or the configuration model is used in a given PEP. The outsourcing and configuration models have different functional advantages and disadvantages. If the outsourcing model is used, for example, certain useful features of the configuration model may not be available, and vice versa.

It would be desirable to provide an improved service activation/deactivation framework.

SUMMARY OF THE INVENTION

In accordance with an implementation, a system is provided that includes a service activation engine (SAE) including a policy information base (PIB) file that defines a plurality of attachments that correspond to a plurality of network policies, and a server. The server may be configured to receive a request, using common open policy service for policy provisioning (COPS-PR), for a network service related to an interface handle associated with a subscriber device; determine which ones of the network policies correspond to the network service; and send, using COPS-PR, a provisioning instance (PRI) including a first of the attachments to implement the ones of the network policies to the interface handle based on the attachments.

In accordance with another implementation, a method is provided. The method may include defining, by a policy decision point (PDP), a plurality of attachments that correspond to a plurality of policy services; receiving a service activation request associated with a handle interface, the service activation request including COPS-PR; identifying a set of the policy services that correspond to the service activation request; and generating a policy decision using COPS-PR that includes a set of attachments corresponding to the identified set of policies.

In accordance with yet another implementation, a computer readable medium that stores instructions executable by a processing device is provided. The computer readable medium may include instructions for dynamically creating an interface connection in a policy enforcement point (PEP), the interface connection being identified by a handle and associated with a subscriber device; instructions for generating a COPS-PR message notifying a PDP of the handle; instructions for creating an attachment at the PDP including a set of rules for provisioning the handle with a set of policies corresponding to services associated with the subscriber device; instructions for searching shared context maintained by the PEP for a policy list that matches the set of rules irrespective of how the rules are ordered within the set; and instructions for creating actions within the shared context when the searching does not produce a match.

In accordance with still another implementation, a device is provided. The device may include means for dynamically creating an interface handle in a PEP in a network; means for notifying a PDP in the network of the interface handle using COPS-PR; means for defining a plurality of attachments representing a plurality of policies corresponding to network services; and means for statically configuring a shared context of the PEP to provision the attachments to the interface handle via policy decisions from the PDP to the PEP using COPS-PR, wherein the shared context is not modifiable from within the PEP.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include a policy server operating as a policy decision point (PDP) to make determinations with respect to one or more network policies that may be implemented via a routing or switching device operating as a policy enforcement point (PEP) with respect to one or more subscriber devices, or endpoints. "Policy," as used herein, refers to any set of instructions that may be used to alter the operation of a device or network. For example, a policy may apply a set of operations to packets traversing a particular interface established in the routing device. A policy may define, for example, a filter, a rate limit, etc.

The policy server may process a network services request and may send information about one or more network service decisions to a routing device, such as a policy enforcement point (PEP). For example, the server may send a set of attachments to be applied to a handle created in the routing device. The routing device may attach the attachments to the handle using a shared context that includes provisioning instances (PRIs) that form a policy list corresponding to the attachments and identified by its provisioning instance identifier (PRID).

Implementations described herein may operate with substantially any number of subscriber devices, servers, SAE servers, and/or routers to implement substantially any number of network policies. In addition, implementations of PDPs and/or PEPs may be implemented in non-networked environments, such as in standalone devices.

The term "transaction," as used herein, may include two or more distinct operations that are associated together such that a transaction completely occurs (i.e., commits) based on the performance of each of the operations or not at all (i.e. aborts). In response to a COPS-PR REQ message, for example, a transaction may include a DEC message followed by a (successful) RPT message to commit. Individual operations may be performed atomically, i.e., in "atoms." A transaction, then, may include a collection of atoms. An atom may be deemed to be equivalent to a provisioning instance, i.e., an entry in a table that is specified, for example, in a policy information base (PIB) file. Transaction types may include those that include operations that alter a state (e.g., by affecting an atom(s)) of the PDP and/or the PEP (i.e., a WRITE operation), and those which do not (i.e., a READ operation).

Exemplary System

Figure 1:
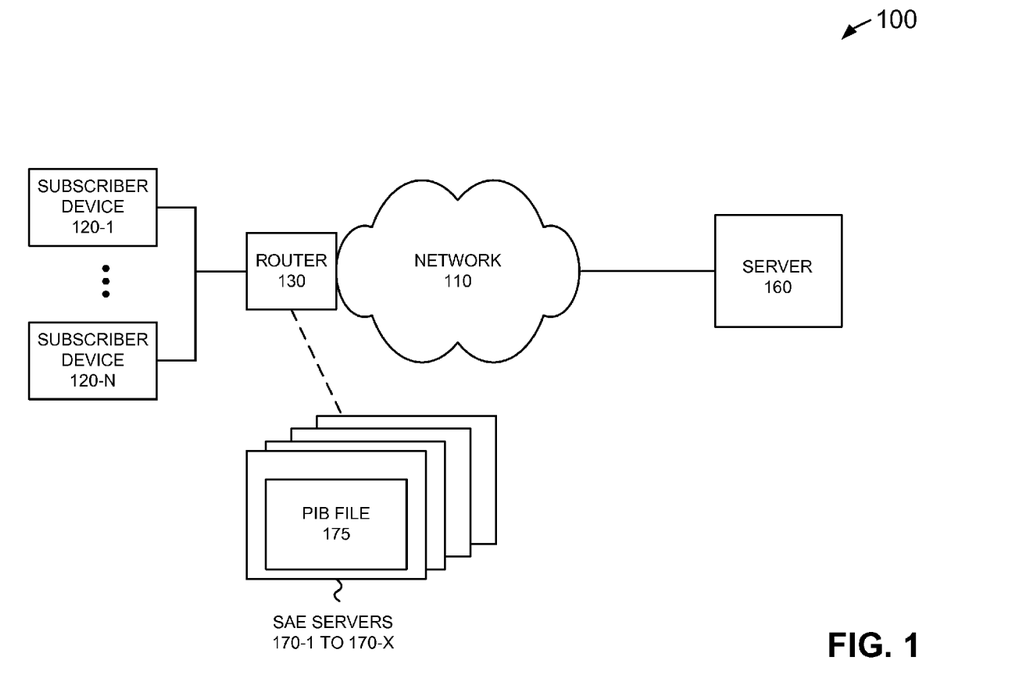
FIG. 1 is a diagram of an exemplary system in which systems and methods consistent with the principles of the invention may be implemented.

FIG. 1 is a diagram of an exemplary system 100 in which systems and methods consistent with the principles of the invention may be implemented. As illustrated, system 100 may include a network 110, a group of subscriber devices 120-1 through 120-N (collectively referred to hereinafter as subscriber devices 120), a router 130, a server 160, and service activation engine (SAE) servers 170-1 through 170-X (collectively referred to hereinafter as SAE servers 170). It will be appreciated that the number of devices illustrated in FIG. 1 is provided for simplicity. In practice, a typical system may include more or fewer devices than illustrated in FIG. 1. Moreover, system 100 may include other devices (not shown) that aid in the reception, processing, and/or transmission of data.

Network 110 may include any network capable of transferring a data unit. "Data unit," as used herein, may refer to any type of machine-readable data having substantially any format that may be adapted for use in one or more networks, such as network 110. A data unit may include packet data and/or non-packet data. Implementations of network 110 may include local area networks (LANs), public switched telephone network (PSTN), metropolitan area networks (MANs) and/or wide area networks (WANs), such as the Internet, that may operate using substantially any network protocol, such as the Internet protocol (IP) or the asynchronous transfer mode (ATM) protocol. Network 110 may include network devices, such as routers, switches, firewalls, and/or servers (not shown). Network 110 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Subscriber devices 120 may include any device capable of transmitting and/or receiving data from network 110. For example, subscriber devices 120 may include a personal computer, a laptop computer, a personal digital assistant (PDA), a television, a telephone device, a video game console a web-enabled cellular telephone, or another computation or communication device. Subscriber devices 120 may connect to router 130 via any type of connection, such as wired, wireless, and/or optical connections. In one implementation, subscriber devices 120 may connect to router 130 through a service provider's access network (e.g., a cable modem network, a digital subscriber line access multiplexer (DSLAM), etc.).

Router 130 may include a device capable of receiving data from subscriber devices 120 and routing the data to/through network 110. Router 130 may also receive data from network 110 and route the data to the appropriate subscriber device 120. In one implementation, router 130 may include a Juniper Networks™ ERX edge router. In one implementation, router 130 may be a public interface to network 110. Router 130 may operate in cooperation with SAE servers 170 to provide respective communication services to subscriber devices 120. In one implementation, SAE servers 170 may operate as a policy decision point (PDP) and may provision one or more network policies to a network associated with interface subscriber devices 120. Router 130 may operate as a policy enforcement point (PEP) on behalf of SAE servers 170 by allowing subscriber devices 120 to access resources on server 160, for example, when subscriber devices 120 are authorized to do so according to one or more network policies administered by router 130.

Server 160 may include a computer device that stores and/or runs applications that provide and/or aid in providing media content to subscribers associated with subscriber devices 120. Media content may include, for example, video-on-demand, live or pre-recorded television or radio broadcasts, streaming music, on-line gaming, or other voice and/or video content. In fact, media content may include any content that is stored or dynamically generated in real-time on one or multiple network devices.

SAE servers 170 may include hardware or software logic to store information related to network policies. For example, SAE servers 170 may store information related to a network policy that activates a service (e.g., making network resources available to a subscriber device 120) that requires authorization and triggers reservation of bandwidth and/or QoS resources by SAE servers 170 and/or router 130. In one implementation, SAE servers 170 determine the nature of a network service associated with a subscriber and translates the network service into a set of policies. SAE servers 170 may communicate network policy information, such as policy enforcement instructions, to router 130 directly, via a dedicated link or indirectly, for example, via network 110.

SAE servers 170 may include computer devices that retrieve requested service policies and subscriber profiles from, for example, a lightweight directory access protocol (LDAP) based directory and configure a router, such as router 130, to deliver a subscriber requested service to subscriber devices 120. SAE servers 170 may translate services into policies and send the policies to router 130. SAE servers 170 may each include one or more policy information base (PIB) files that describe network policies in a textual format. A single PIB 175, as illustrated in FIG. 1, however, may be shared by two or more SAE servers. PIB 175 may be implemented in hardware, software, or a combination of hardware and software.

Exemplary Router Configuration

Figure 2:
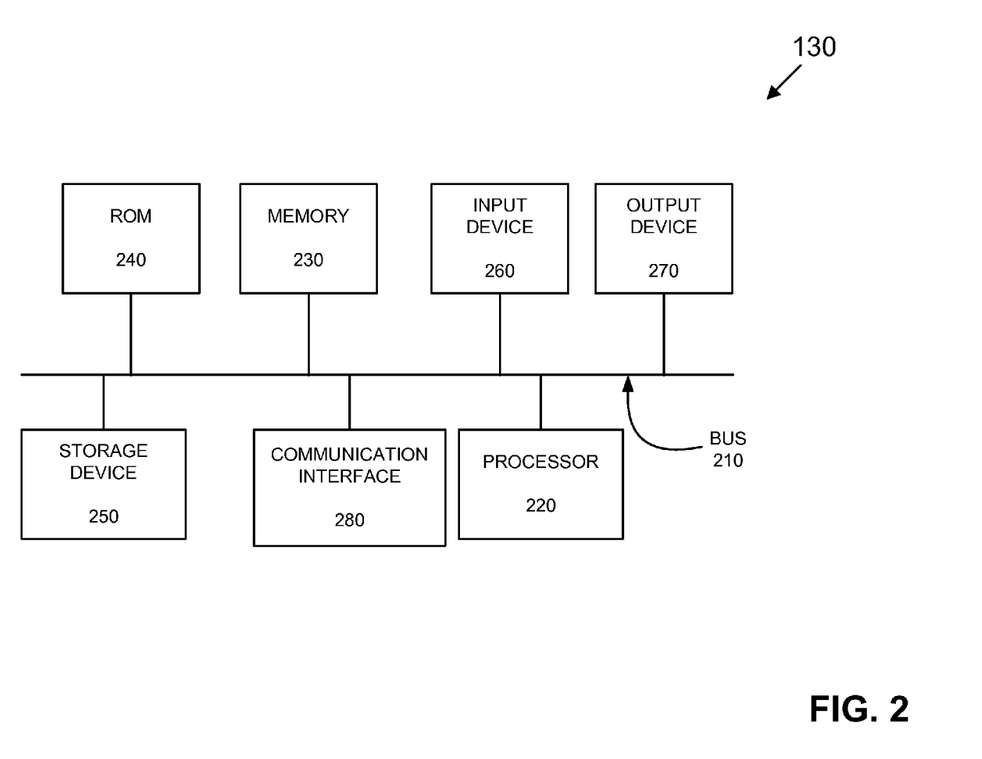
FIG. 2 is a diagram of an exemplary server shown in FIG. 1.

FIG. 2 illustrates an exemplary architecture for implementing an SAE servers 170 of FIG. 1. It will be appreciated that subscriber devices 120, router 130, server 160 and/or other devices in system 100 may be similarly configured. As illustrated in FIG. 2, SAE servers 170 may include a bus 210 that may include one or more interconnects that permit communication among a processor 220, a memory 230, a read only memory (ROM) 240, a storage device 250, an input device 260, an output device 270, and a communication interface 280.

Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220. ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to SAE servers 170, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables SAE servers 170 to communicate with other devices and/or systems, such as subscriber devices 120, server 160, and/or or routers 130. For example, communication interface 280 may include one or more interfaces, such as a first interface coupled to subscriber device 120 and/or a second interface coupled to network 110. Alternatively, communication interface 280 may include other mechanisms for communicating via a network, such as network 110.

SAE servers 170 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Router Functional Diagram

Figure 3:
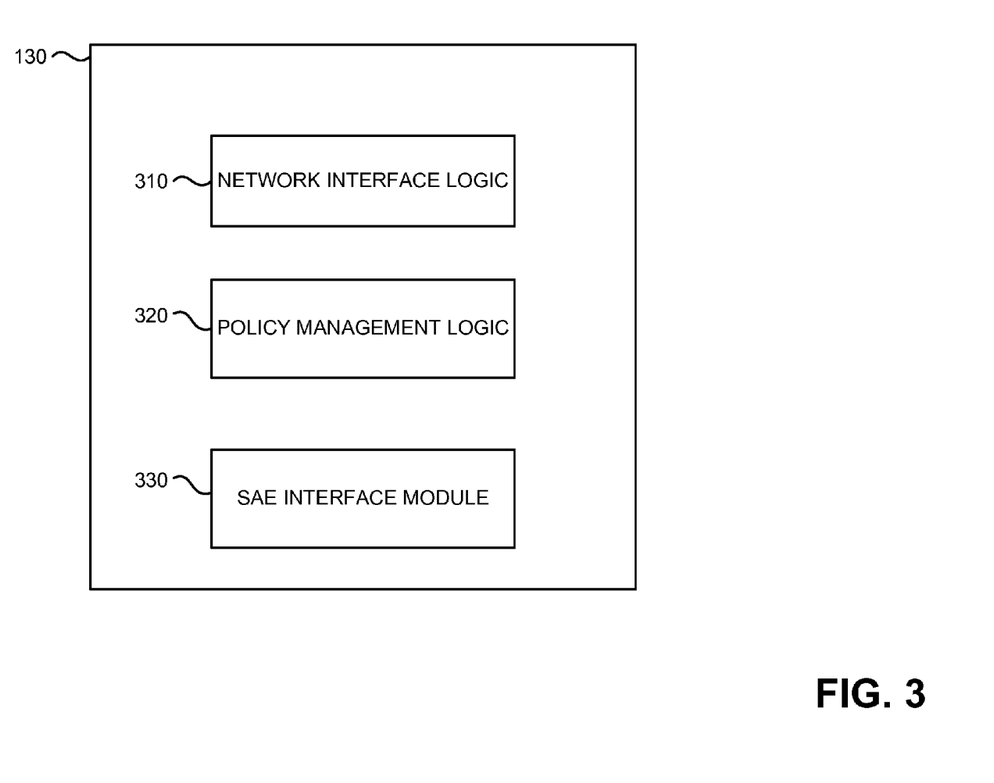
FIG. 3 is a functional diagram of an exemplary router shown in FIG. 1.

FIG. 3 illustrates a functional diagram illustrating an exemplary router 130 of FIG. 1. The functional diagram of FIG. 3 may include network interface logic 310, policy management logic 320, and SAE interface module 330. The implementation of FIG. 3 is exemplary, and router 130 may include more or fewer functional components without departing from the spirit of the invention.

Network interface logic 310 may include hardware or software to route data between subscriber devices 120 and server 160 according to applicable network policies. In one implementation, network interface logic 310 may establish a network interface between one or more subscriber devices 120 and network 110 upon receiving a connection request from the one or more subscriber devices 120. In one implementation, network interface logic 310 may configure a virtual router associated with an established network interface. Network interface logic 310 may assign network addresses to the respective network interfaces. In one implementation, the network interface may include an egress route and an ingress route for data transmissions (traffic) to subscriber devices 120 and from subscriber devices 120, respectively. Network interface logic 310 may be implemented in communication interface 280 or elsewhere in router 130.

Policy management logic 320 may include hardware or software to process instructions or data related to operations performed by router 130. For example, policy management logic 320 may be implemented in processor 220 and may make policy information available to another device, software module, or component operating in router 130, such as SAE interface module 330. Policy management logic 320 may include policy information that identifies one or more network policies related to subscriber devices 120. In one implementation, policy management logic 320 may include policy information that identifies one or more network policies related to a network interface ingress and/or a network interface egress maintained, for example, by network interface logic 310. Policy management logic 320 may group the network policies, for example, in network policy lists, as described in more detail below.

Policy information may include information that identifies one or more policies related to subscriber devices 120, network 110, and/or server 160. Policy information may include information identifying a single policy or multiple policies, and SAE servers 170 may send policy information to a single router, such as router 130, or to multiple routers. In one implementation, policy information may identify a network policy by name, number, or other identifier. In another implementation, policy information may include the contents of one or more policies. In one implementation, SAE servers 170 may retrieve policy information from PIB file 175, translate the retrieved policy information into policies, and provide the policies to SAE interface module 330.

SAE interface module 330 may include hardware or software to process instructions or data related to communications between SAE servers 170 and router 130 including, for example, operations performed by network interface logic 310 and policy management logic 320. In one implementation, SAE interface module 330 may notify network interface logic 310 and/or SAE servers 170 of the creation and/or deletion of a network interface. In one implementation, SAE interface module 330 may receive network policies from SAE servers 170 and forward the network policies to policy management logic 320. In another implementation, SAE interface module 330 may translate the network policies received from SAE servers 170. SAE servers 170 may forward the policies to policy management logic 320.

Exemplary Processing

Figure 4:
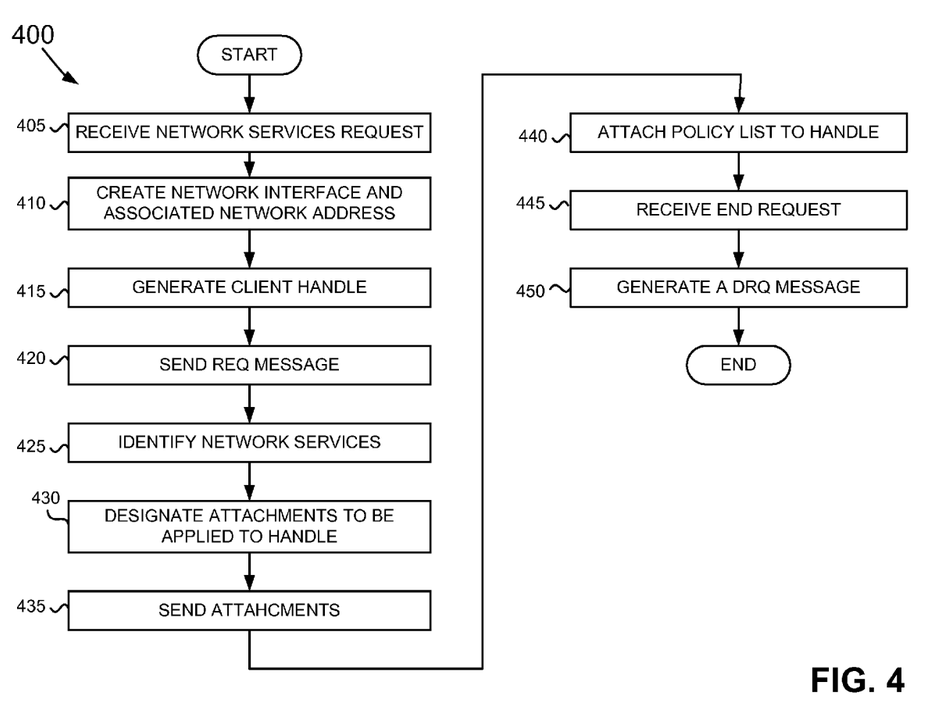
FIG. 4 is a flowchart of exemplary processing to implement network policies.

FIG. 4 illustrates an exemplary process 400 to implement network policies consistent with principles of the invention.

In one implementation, exemplary process 400 may be performed by SAE servers 170 and/or router 130.

Processing may begin with receiving a request from one of subscriber devices 120 at router 130, for example, at network interface logic 310, for one or more network services (act 405). For example, a logon request may be made that includes an identity of the particular subscriber device 120. In one implementation, an outsourcing model of COPS-PR provisioning may be used to dynamically create a network interface associated with the logon request and to assign a network address to the newly created network interface (act 410). A client handle associated with the network interface and/or the assigned network address may be generated that identifies a specific request state (act 415). SAE interface module 330 may send a REQ message associated with the handle to one of SAE servers 170, for example, using COPS-PR provisioning (act 420).

In one implementation, a configuration model of COPS-PR provisioning may be used to configure router 130 with respect to the handle associated with subscriber device 120 in accordance with the applicable SLA. SAE server 170 may identify the network services associated with the subscriber device and the specific request, for example, based on a profile associated with the subscriber device 120 (act 425). SAE server 170 may determine one or more policies that correspond to the network services, for example using PIB file 175. PIB file 175 may describe attachments corresponding to a set of policies. SAE server 170 may identify the policies that are to be applied to the handle (act 430). SAE server may identify the policies in the context of a handle using information (objects) called an attachment herein. SAE server 170 may search existing policy lists for a match. SAE server 170 may search the policy lists by comparing the action identifiers, without accessing the contents (objects) of the rules. If an existing match is found, the existing policy list may be shared between two or more network interfaces on router 130.

SAE server 170 may forward (push) the attachments to router 130, for example, which may be received by router 130 via SAE interface module 330 (act 435). SAE interface module 330 may provide the attachment information associated with the particular client handle, for example, to policy management logic 320.

Policy management logic 320 may maintain a configuration context associated with router 130. In one implementation, policy management logic 320 may maintain a single configuration context for a virtual router associated with router 130. In other words, all of the policies being applied to existing (operational) network interfaces by the virtual router may be maintained in a shared configuration context. In another implementation, the configuration context maintained by policy management logic 320 may be modified by SAE servers 170, and effectively may not be modified by events associated with router 130. The configuration context may maintain QoS profiles. The configuration context may maintain the policy lists associated with each network interface existing on router 130. Other information may be maintained in the configuration context. Using policy management logic 320 and/or network interface logic 310, the appropriate policy list maintained in the shared configuration context may be attached to the handle (act 440). In this way, the handle may have an associated set of entries or provisioning instances (PRIs) that identify which policies are to be applied by network interface logic 310 to data packets traversing the network interface.

The subscriber device 120 may send a request terminating the network services, which may be received by router 130, for example, at network interface logic 310 (act 445). For example, a disconnection request may be received by the network interface. SAE interface module 330 may generate a delete request (DRQ) message that is sent to SAE server 170 (act 450). Thus, the network interface may be ended without any modification to the shared configuration context.

In one implementation consistent with principles of the invention, a policy list associated with a network interface may be represented, for example, in a shared configuration context, as a set of rules that point to corresponding actions that are identified by an identifier. The order of performance of the actions in a policy list may be set according to a precedence order, for example, as defined by the relevant PIB file 175. In one implementation, the rules are not represented in a linked list. Accordingly, the attachment(s) created by SAE servers 170 described above, may be in the form of a rule set that includes a set of actions.

In another implementation, should the subscriber device 120 send a message to router 130 requesting additional services (consistent with the applicable SLA), SAE server 170 may generate one or more additional rule sets that include the additional actions that correspond to the requested services. Again, a search may be performed for an existing policy list that includes each rule set (the original rules plus the additional rules). Where no match is found, SAE server 170 may rename the original rule set that point to the existing actions, and create new actions that correspond to the additional network services.

Figure 5:
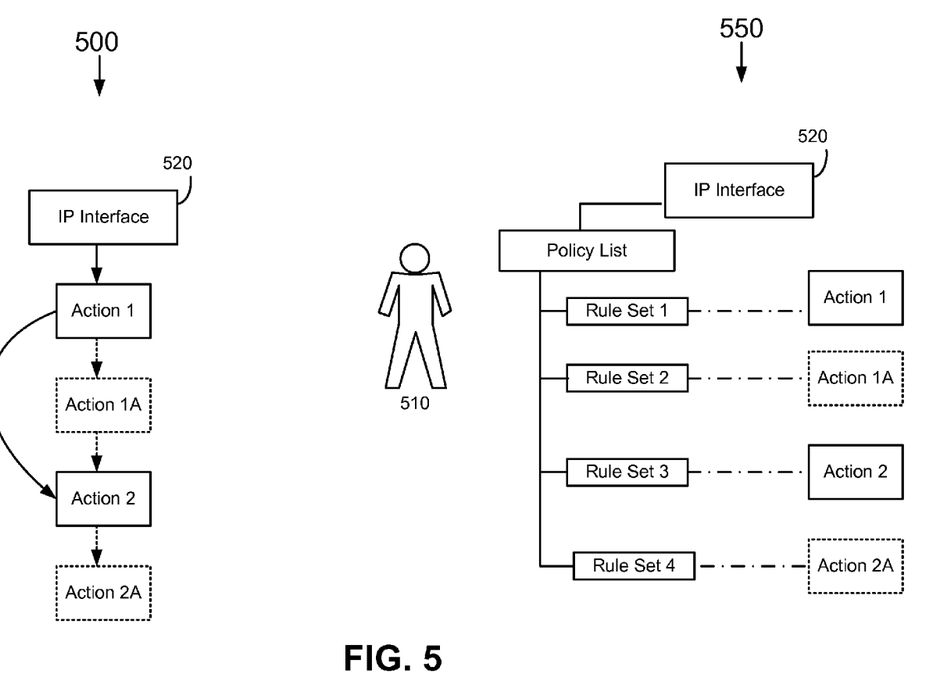
FIG. 5 is a diagram of an exemplary implementation.

FIG. 5 illustrates an exemplary implementation for providing service activation and/or service deactivation, as well as another method for providing service activation/deactivation. In particular, FIG. 5 depicts a method of policy provisioning as described above, contrasted with a method of policy provisioning using differentiated services (DiffServ), such as that defined in IETF document, RFC 3317, Differentiated Services Quality of Service Policy Information Base.

Referring to the DiffServ example 500, a subscriber 510 may request an Internet connection via a router, for example, during login. An IP interface 520 associated with the request may be established by the router. A handle may identify IP interface 520. The router may notify an associated policy decision point (PDP) of the existence of the handle. The PDP may identify subscriber 510 as being associated with the handle. Assume that under the applicable service level agreement (SLA) with the responsible Internet service provider (ISP), one or more designated services (e.g., a certain bandwidth guarantee, etc.) are to be activated upon login by the subscriber. The PDP translates the services into policies as defined in a policy information base (PIB) file, for example, according to RFC 3317. The PDP may provide the policies to the router. The router manages the policies as a policy list associated with the handle. Assume that the policy list consists of Action 1 linked to Action 2. That is, Action 1 and Action 2 must be created and linked, for example, by a policy manager. Packets received/transmitted via the IP interface are to be subjected to Action 1 and Action 2 in an order determined by the linkage.

Now, assume that subscriber 510 requests an additional service (e.g., a movie download) to the services activated at login in accordance with the SLA. The router notifies the PDP of the received request for additional services. The PDP translates the additional services into one or more policies as defined by the PIB file. The PDP provides the additional policies to the router. The policy manager will modify the original policy list to add the additional policies. Assume that the additional policies require that Action 1A be created and linked between Action 1 and Action 2, and that Action 2A be created and linked to Action 2. In doing so, the policy manager will identify the policy list by the existing actions (Action 1 and Action 2) as a linked list. Once identified, the policy manager destroys the original link between Action 1 and Action 2, and create the needed links between Actions 1 and 1A, Actions 1A and 2, and Actions 2 and 2A. When the additional services are no longer needed (e.g., downloading of the movie ends), the policy list must again be modified in a similar manner.

By contrast, assume that subscriber 510 requests an Internet connection via a router, for example, during login, according to the exemplary implementation 550. An IP interface associated with the request may be established by the router. The IP interface may be identified by a handle. The router may notify an associated SAE of the existence of the handle. The SAE may identify subscriber 510 as being associated with the IP interface. Assume that under the applicable SLA with the responsible ISP, one or more designated services (e.g., a certain bandwidth guarantee, etc.) may be activated upon login by the subscriber. The SAE may identify policies corresponding to the services. The policies may be defined in the PIB file as attachments. The SAE may provide the attachments to the router using COPS-PR. The router may manage the attachments as a policy list associated with the IP interface. The policy list may include one or more rule sets that specify the actions to be performed on packets received and/or transmitted via the IP interface. The rule set may be represented as a provisioning instance identifier (PRID), for example. The rule sets may include a precedence order that is defined, for example, in the PIB file. Assume that the policy list includes Rule Set 1 (corresponding to Action 1) and Rule Set 2 (corresponding to Action 2). That is, Action 1 and Action 2 must be created, for example, by a policy manger.

As before, now assume that subscriber 510 requests an additional service (e.g., a movie download) in accordance with the SLA. The router may notify the SAE of the received request for additional services. The SAE may translate the additional services into one or more attachments (corresponding to policies) as defined by the PIB file. The SAE may provide the additional attachments to the router. The policy manager may modify the original policy list to add the additional attachments as Rule Set 1A (corresponding to Action 1A) and Rule Set 2A (corresponding to Action 2A). Assume that the rules sets require that Action 1A and Action 2A be created. In doing so, the policy manager may identify the policy list by the existing rule sets (Rule Set 1 and Rule Set 2), and modify the policy list to include Rule Set 1A and Rule Set 2A irrespective of any ordering of rule sets within the policy list.

Now assume that another subscriber 560 requests an Internet connection via the router, for example, during login. An IP interface associated with the request may be established by the router. A handle may identify the IP interface. The router may notify an associated SAE of the existence of the handle. The SAE may identify subscriber 560 as being associated with the handle. Assume that under the applicable SLA with the responsible ISP, designated services corresponding to Actions 1, 1A, 2, and 2A are to be activated upon login by the subscriber. The SAE may identify policies corresponding to the services. The policies may be defined in the PIB file as attachments. The SAE may provide the attachments to the router using COPS-PR. The policy manager may search for an existing policy list that includes rule sets corresponding to Actions 1, 1A, 2, and 2A. The search may determine the existence of the policy list associated with subscriber 510, which includes Rule Sets 1-4. Thus, the policy list may be shared, and the packets received and/or transmitted via the handle associated with subscriber 560 may be subjected to the actions defined by Rule Sets 1-4.

Assume that subscriber 560 requests additional services to the services activated at login. The router may notify the SAE of the received request for additional services. The SAE may translate the additional services into one or more attachments (e.g., corresponding to Action 3 and Action 4) as defined by the PIB file. The SAE may provide the additional attachments to the router. The policy manager may search for an existing policy list that includes rule sets corresponding to Actions 1, 1A, 2, 2A, 3 and 4. The search may determine no such policy list exists. Accordingly, the policy manger may designate a new policy list to be applied to the handle associated with subscriber 560. The policy manger may rename Rule Sets 1-4 as Rule Sets 5-8 (which continue to respectively refer to Actions 1, 1A, 2, 2A). The policy manager may create Actions 3 and 4. The policy Manger may designate Actions 3 and 4 as Rule Sets 9 and 10, for example, using PRIDs.

Further, when subscriber 510 and/or subscriber 560 logs off, the router may or may not notify the SAE of the deletion of the handle.

In one implementation, SAE servers 170 may be configured to implement transaction semantics in a manner so as to provide transaction semantics on the service layer using the atomicity requirements of COPS-PR on DEC messages. For example, the PEP may be configured to function as an atomic data store. SAE servers 170 may be configured to map a transaction to a DEC message. For example, SAE servers 170 may be associated with multiple clients, for which a number of service activations/de-activations may happen substantially concurrently. Each REQ/DRQ message may cause the creation of at least one transaction. Each transaction may involve different DEC messages based on an order that the REQ/DRQ messages are received, and the kind of atoms to be installed on the PEP.

SAE servers 170 may be configured to define WRITE operations to include NEW, MOD (modification), REM (remove), NEW VER (new version), MOD VER (modification version), and REM VER (remove version), for example. A NEW operation may result in creation of an atom in the PEP. A NEW VER operation may result in creation of new name for an atom in the PDP. A REM operation may remove an atom from the PEP. A REM VER operation may remove an atom from the PDP. A MOD operation may modify an atom in the PEP. A MOD VER operation may modify an atom in the PDP. SAE servers 170 may be configured to update a reference count to an atom, for example, in the PDP, based on a READ operation.

SAE servers 170 may be configured to create a dependency between two or more transactions that seek to perform operations related to one or more common atoms, e.g., in the shared context. In one implementation, SAE servers 170 may be configured with rules of logic for constructing transaction dependency trees with pending transactions being the nodes of such trees. For example, a dependency tree may define parent-child node relationships in which the parent node is independent of a child node, and a child node is dependent from a parent node, and that nodes not in a parent-child relationship are independent of one another. Dependency may be defined such that a dependent transaction may not be executed until the pending or scheduled transaction from which it depends (its parent) is executed and committed.

Properties of a transaction dependency tree may include the removal of a transaction (node) from the tree once the transaction has committed. That is, independent transactions may be scheduled for installation immediately, for example, a DEC message can be generated by the PDP and sent to the PEP. In this way, multiple DECs may be generated/sent in parallel. Orphaned transactions (child nodes having no parents) may become independent parents (roots) of their own tree. A parent may have any number of children. A child may have any number of parents. A parent cannot be the child of its children or their descendants.

SAE servers 170 may be configured to define dependency types as either READ-WRITE, WRITE READ, or WRITE-WRITE dependencies. A WRITE-WRITE dependency may result in defined conflicts, including MOD-MOD, MOD-REM, REM-MOD, and REM-NEW. SAE servers 170 may be configured to resolve dependency conflicts in the following manner. A MOD-MOD conflict detected by SAE servers 170 may be resolved by creating a new atom having a different identifier in the PEP with the effective result of the MOD. A potential MOD-REM or REM-MOD conflict detected by SAE servers 170 may be avoided by placing an exclusive lock in the global state of the atoms, for example, that are referenced in SAE servers 170, while a transaction is being built and forbidding that an atom with a reference count greater than one be modified or removed. A REM-NEW conflict detected by SAE servers 170 may be resolved by creating a new version of an atom having a different identifier in the PEP. A READ-WRITE dependency is avoided by placing an exclusive lock in the global state of the atoms while a transaction is being built and forbidding an atom with a reference count greater than one to be modified or removed. In this way, the WRITE operation may become a READ that decrements a reference count on an atom in case of a REM operation, or a MOD turns into a NEW operation, creating a new atom and thus breaking the dependency. A WRITE-READ dependency causes no conflicts.

In another implementation, SAE servers 170 may be configured to form transaction chains between related transaction actions, i.e., transactions in which objects are to be manipulated in both a shared context and an interface context, e.g., service activation/de-activation. In scheduling transactions related to activation, for example, a transaction chain may be defined to execute the primary transaction (e.g., install atoms in the shared context) before executing the secondary transaction (e.g., attach policy list atoms to interface context). In scheduling transactions related to de-activation, for example, a transaction chain may be defined to execute the primary transaction (e.g., uninstall atoms from the shared context) after executing the secondary transaction (e.g., detach policy list atoms from the interface context). In scheduling transactions related to service modification operations, for example, a transaction chain may be defined to execute the primary transaction (e.g., uninstall atoms from the shared context) after executing the secondary transaction (e.g., attachment of new policy list atoms to the interface context), which is executed after execution of a tertiary transaction (e.g., install the new atoms in the shared context). Each such transaction may be part of a transaction dependency tree independently of the other transactions in the chain.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may be modified in other implementations consistent with the principles of the invention. Further, non-dependent acts may be performed in parallel.

For example, implementations consistent with principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A system comprising:
a service activation engine (SAE) including:
a policy information base (PIB) file that defines a plurality of attachments that correspond to a plurality of network policies;
a server to:
receive a request, using common open policy service for policy provisioning (COPS-PR), for a network service related to an interface handle associated with a network interface created for a subscriber device,
determine which one or more of the network policies correspond to the network service, and
send, using COPS-PR, a provisioning instance (PRI) including a first of the attachments to implement the one or more of the network policies to the interface handle based on the attachments; and
a routing device including:
network interface logic to apply the one or more of the network policies to data packets associated with the interface handle,
policy management logic to maintain a shared configuration context, in which the one or more of the network policies are contained as a set of policies, between the network interface and at least one other network interface created for another subscriber device, and
a service activation engine (SAE) interface module to communicate with the SAE.

2. The system of claim 1, where the network interface logic is to delete the interface handle without modification to the one or more of the network policies in the shared configuration context.

3. The system of claim 2, where the SAE interface is to not notify the SAE of the deleted interface handle.

4. The system of claim 2, where the SAE interface module is to notify the SAE of the deleted interface handle and the SAE is to not respond to the notification.

5. The system of claim 1, where the network interface logic is to apply the set of policies to another interface handle associated with the at least one other network interface created for the other subscriber device.

6. The system of claim 1, where the server is to receive a subsequent request, using COPS-PR, to deactivate the network service and send a subsequent PRI to the routing device via the SAE interface module, and the policy management logic is to modify the set of policies associated with the interface handle while retaining the ones of the network policies in the shared configuration context.

7. The system of claim 1, where the set of policies comprises rule sets including identifiers of actions to be performed on at least some of the data packets to activate the network service.

8. The system of claim 7, where the policy management logic is to compare the identifiers of the actions to identifiers associated with existing actions in the shared configuration context without accessing contents of existing actions.

9. The system of claim 8, where the comparison is made based on a precedence order associated with each of the existing actions.

10. The device of claim 8, where the comparison is made based on the existing actions as members of the rule sets and not as a linked list.

11. The system of claim 8, where when the comparison results in a match, the set of policies is shared between the interface handle and at least one other interface handle associated with the at least one other network interface.

12. The system of claim 8, where when the comparison results in a partial match, additional actions are created in the shared configuration context and the rules sets are renamed to point to the existing actions and the additional actions.

13. A method comprising:
    defining, by a policy decision point (PDP), a plurality of attachments that correspond to a plurality of policy services;
    receiving, by the PDP a service activation request associated with a handle interface associated with a network interface created for a subscriber device, the service activation request comprising common open policy service for provisioning (COPS-PR);
    identifying, by the PDP, a set of the policy services that correspond to the service activation request;
    generating, by the PDP, a policy decision using COPS-PR that includes a set of attachments corresponding to the identified set of policies;
    maintaining by a policy enforcement point (PEP), a shared configuration context, that includes policy lists, between the network interface and at least one other network interface created for another subscriber device;
    comparing the set of attachments to at least some of the policy lists; and
    applying, when the set of attachments matches a first policy list, the set of policy services associated with the first policy list to the handle interface.

14. The method of claim 13, further comprising:
    creating, when the set of attachments does not match any of the policy lists, actions in the shared configuration context that correspond to the policy services.

15. The method of claim 13, where the policy lists comprise rule sets, and the comparing the set of attachments to the at least some of the policy lists includes determining whether the rule sets are in the policy lists irrespective of an order of the respective policy services in the policy lists.

16. The method of claim 13, where the policy lists comprise rule sets that include identifiers, and comparing the set of attachments to the at least some of the policy lists includes comparing the rule sets identifiers to identifiers associated with the respective policy services in the policy lists without accessing the contents of the policy services.

17. The method of claim 13, where the first policy list comprises a rule set, the method further comprising:
    receiving a service deactivation request associated with the handle interface; and
    modifying the rule set to achieve the service deactivation without deleting actions in the shared configuration context that are associated with the first policy list.

18. The method of claim 17, where the service deactivation request comprises a deletion of the interface handle.

19. One or more memory device that store instructions executable by a processing device, comprising:
    instructions for dynamically creating an interface connection in a policy enforcement point (PEP), the interface connection being identified by a handle and associated with a network interface created for a subscriber device;
    instructions for generating a common open policy service for provisioning (COPS-PR) message notifying a policy decision point (PDP) of the handle;
    instructions for creating an attachment at the PDP including a set of rules for provisioning the handle with a set of policies corresponding to services associated with the subscriber device;
    instructions for searching shared configuration context, between the network interface and at least one other network interface created for another subscriber device, maintained by the PEP for a policy list that matches the set of rules irrespective of how the rules are ordered within the set; and
    instructions for creating actions within the shared configuration context when the searching does not produce a match.

20. A device comprising:
    means for dynamically creating an interface handle, associated with a network interface created for a subscriber device, in a policy enforcement point (PEP) in a network;
    means for notifying a policy decision point (PDP) in the network of the interface handle using common open policy service for provisioning (COPS-PR);
    means for defining a plurality of attachments representing a plurality of policies corresponding to network services; and
    means for statically configuring a shared context of the PEP, between the network interface and at least one other network interface created for another subscriber device, to provision the attachments to the interface handle via policy decisions from the PDP to the PEP using COPS-PR, where the shared context is not modifiable from within the PEP.

21. The device of claim 20, further comprising:
    means for scheduling received transactions according to rules of dependency for two or more received transactions involving operations to be performed on one or more common atoms of the shared context.

* * * * *

UNITED STATES PATENT AND TRADEMARK OFFICE
CERTIFICATE OF CORRECTION

| | | |
|---|---|---|
| PATENT NO. | : 7,734,784 B1 | Page 1 of 1 |
| APPLICATION NO. | : 11/534460 | |
| DATED | : June 8, 2010 | |
| INVENTOR(S) | : Wladimir Araujo et al. | |

It is certified that error appears in the above-identified patent and that said Letters Patent is hereby corrected as shown below:

Column 13, Line 20 should read: "11. The system of claim 8, where, when the comparison"
Column 13, Line 24 should read: "12. The system of claim 8, where, when the comparison"
Column 13, Line 32 should read: "receiving, by the PDP, a service activation request associ-"
Column 13, Line 42 should read: "maintaining, by a policy enforcement point (PEP), a shared"

Signed and Sealed this

Third Day of August, 2010

David J. Kappos
*Director of the United States Patent and Trademark Office*